US006347335B1

(12) United States Patent
Shagam et al.

(10) Patent No.: US 6,347,335 B1
(45) Date of Patent: *Feb. 12, 2002

(54) SYSTEM USING A COMMON AND LOCAL EVENT LOGS FOR LOGGING EVENT INFORMATION GENERATED BY PLURALITY OF DEVICES FOR DETERMINING PROBLEM IN STORAGE ACCESS OPERATIONS

(75) Inventors: Eli Shagam; Natan Vishlitzky, both of Brookline; Yuval Ofek, Hopkinton, all of MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/532,240

(22) Filed: Sep. 22, 1995

(51) Int. Cl.[7] .............................................. G06F 15/173
(52) U.S. Cl. ........................................ 709/223; 709/223
(58) Field of Search ................................ 364/188, 550; 395/250, 421.07, 800, 413, 182.08, 733, 704; 365/230.03; 709/224, 223

(56) References Cited

U.S. PATENT DOCUMENTS

| 4,720,782 A | * | 1/1988 | Kovalcin ..................... 364/188 |
| 4,800,524 A | * | 1/1989 | Roesgen .................. 395/421.07 |
| 5,136,718 A | * | 8/1992 | Haydt ......................... 395/800 |
| 5,355,484 A | * | 10/1994 | Record et al. .............. 395/704 |
| 5,371,875 A | * | 12/1994 | Eikill et al. ................. 395/413 |
| 5,386,552 A | * | 1/1995 | Garney .................. 395/182.08 |
| 5,555,380 A | * | 9/1996 | Suzuki ....................... 395/250 |
| 5,566,337 A | * | 10/1996 | Szymanski et al. ......... 395/733 |
| 5,592,432 A | * | 1/1997 | Vishlitzky et al. ...... 365/230.03 |
| 5,621,663 A | * | 4/1997 | Skagerling .................. 364/550 |
| 5,745,693 A | * | 4/1998 | Knight et al. ............... 709/224 |

* cited by examiner

Primary Examiner—Le Hien Luu
(74) Attorney, Agent, or Firm—John M. Gunther, Esq.; Krishnendu Gupta, Esq.; Christopher K. Gagne

(57) ABSTRACT

A distributed computer system includes a plurality of computer nodes, including conventional digital computer systems, mass storage subsystems, servers and the like, and a common event log. The common event log includes a plurality of storage locations for storing common event log entries. Each computer node performs processing operations in connection with a program, and generates, at selected points in its program, an event log entry including status information representing status of the computer node at the point at which the log entry was generated, the computer nodes storing the event log entries which they generate in the common event log contemporaneous with the generation thereof. As a result, the event log entries are stored in the common event log in the order in which the computer nodes reach the points in their respective programs. The common event log includes a buffer comprising a plurality of storage locations, and the location at which an entry is to be stored is pointed to by a write pointer. In one embodiment, the various computer nodes are interconnected by a common bus. When a computer node is to store a new entry in the common event log, it retrieves the write pointer, increments it and restores it in an atomic "read/modify/write" operation over the bus, and thereafter may use the write pointer which it retrieved to store the entry in the common event log.

22 Claims, 3 Drawing Sheets

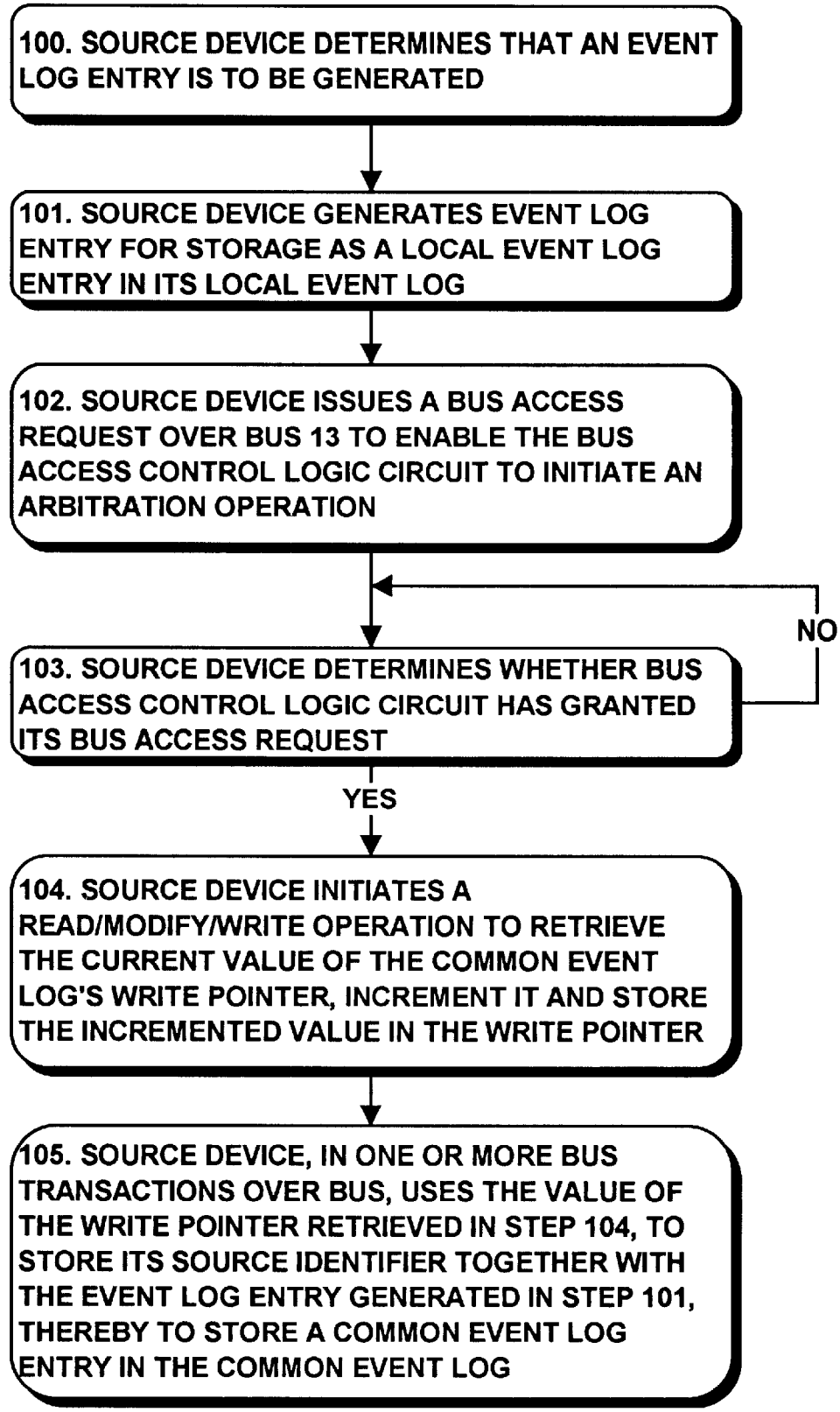

SYSTEM USING A COMMON AND LOCAL EVENT LOGS FOR LOGGING EVENT INFORMATION GENERATED BY PLURALITY OF DEVICES FOR DETERMINING PROBLEM IN STORAGE ACCESS OPERATIONS

FIELD OF THE INVENTION

The invention relates generally to the field of digital computer systems and more particularly to arrangements for logging event information that is generated by various components of a distributed digital computer system, including large-scale mass-storage subsystems, to assist in diagnosing malfunctions. In particular, the invention provides a common event log that stores event information that is independently generated by a plurality of components of a distributed computer system in the order in which the events occurred so that, in the event a malfunction occurs, the log information may be used to assist in diagnosing the cause of the malfunction.

BACKGROUND OF THE INVENTION

A number of facilities are available to assist in analyzing and diagnosing causes of malfunctions in complex digital computer systems. For example, interface signal analyzers, such as SCSI (small computer system interface) analyzers, optical fiber analyzers and the like are used to record and analyze signals transmitted over interfaces connecting the various subsystems comprising a complex computer system. These signals may be helpful in diagnosing hardware problems. These types of devices are typically not permanent components of a digital computer system, but instead are among tools used by field service personnel when performing maintenance on a computer system, and are brought with them to the computer system's site and connected to the computer system while performing maintenance.

Interface signal analyzers, such as those described above, have only limited utility in diagnosing malfunctions which are internal to the various subsystems comprising a complex computer system or malfunctions which occur as a result of problems with software. To help diagnose these problems, subsystems often maintain event logs, in which they store certain information concerning their status at various predetermined points in time during their operations. By analyzing the information stored in the log, the detailed operations performed by the subsystems can be analyzed and compared to their expected operations, with malfunctions being diagnosed based on deviations of the actual contents of the log from the expected contents. The use of event logs to diagnose malfunctions can be very advantageous, since the event log information can be transmitted over telephone lines, for example, to a central field maintenance location for analysis, so that a diagnoses can be performed without the necessity of having field maintenance personnel actually at the sites of the computer systems being diagnosed.

SUMMARY OF THE INVENTION

The invention provides a new and improved arrangement for storing event information that is independently generated by a plurality of components of a computer system to assist in diagnosing the causes malfunctions which may occur.

In brief summary, a distributed computer system includes a plurality of computer nodes, including conventional digital computer systems, mass storage subsystems, servers and the like, and a common event log. The common event log includes a plurality of storage locations for storing common event log entries. Each computer node performs processing operations in connection with a program, and generates, at selected points in its program, an event log entry including status information representing status of the computer node at the point at which the log entry was generated, the computer nodes storing the event log entries which they generate in the common event log contemporaneous with the generation thereof. As a result, the event log entries are stored in the common event log in the order in which the computer nodes reach the points in their respective programs.

The common event log includes a buffer comprising a plurality of storage locations, and the location at which an entry is to be stored is pointed to by a write pointer. In one embodiment, the various computer nodes are interconnected by a common bus. When a computer node is to store a new entry in the common event log, it retrieves the write pointer, increments it and restores it in an atomic "read/modify/write" operation over the bus, and thereafter may use the write pointer which it retrieved to store the entry in the common event log.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 4 constitutes a flow chart depicting the operations performed by the computer system in connection with the invention.

DETAILED DESCRIPTION OF AN ILLUSTRATE EMBODIMENT

Figure 1:
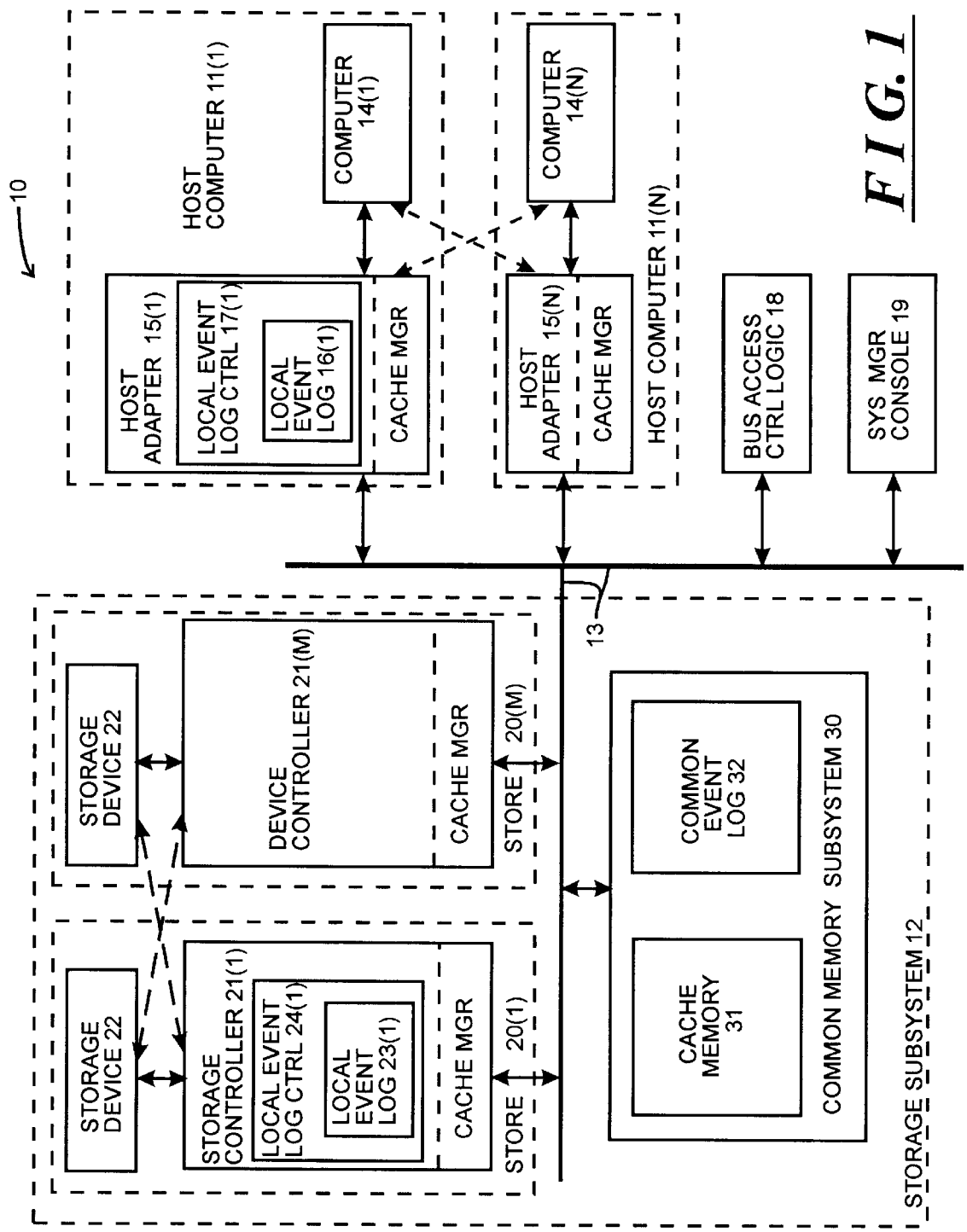
FIG. 1 is a functional block diagram of a digital computer system in accordance with the invention including a common event log.

The invention will be described in connection with a digital computer system 10 depicted in functional block diagram form in FIG. 1. With reference to FIG. 1, computer system 10 includes a plurality of host computers 11(1) through 11(N) (generally identified by reference numeral 11(n)) and a digital data storage subsystem 12 interconnected by a common bus 13. Each host computer 11(n) includes a local computer 14(n), which may comprise, for example, a personal computer, workstation, or the like which may be used by a single operator, or a multi-user computer system which may be used by a number of operators. Each local computer 14(n) is connected to an associated host adapter 15(n), which, in turn, is connected to bus 13. Each local computer 14(n) may control its associated host adapter 15(n) to perform a retrieval operation, in which the host adapter 15(n) initiates retrieval of computer programs and digital data (generally, information) from the digital data storage subsystem 12 for use by the local computer 14(n) in its processing operations. In addition, the local computer 14(n) may control its associated host adapter 15(n) to perform a storage operation in which the host adapter 15(n) initiates storage of processed data in the digital data storage subsystem 12. Generally, retrieval operations and storage operations in connection with the digital data storage subsystem 12 will collectively be referred to as "access operations."

Each host adapter 15(n) includes an associated local event log 16(n) which an event log controller 17(n) may use to store event status information concerning the status of the host adapter 15(n) at selected points during an access operation, which may, in the event an error is detected, assist in diagnosing the cause of the error and in recovering therefrom. Each local event log 16(n), as is conventional, includes a plurality of log entries, with each log entry identifying the point in the access operation at which the log entry was generated and further containing selected types of status information. The various types of status information that are stored in a particular log entry will be determined by the particular point during an access operation at which the log entry was generated. In addition, a log entry will include time stamp identifying the time at which the log entry was generated, with the time being as determined by the host adapter's local clock (not shown). Typically, each local event log 16(n) will store sufficient entries to enable the status of the host adapter to be determined for a selected period of time, which is preferably at least long enough so that, if a malfunction is detected in connection with an access operation, the status information in the log entries that were generated during the access operation can be examined to determine the cause of the malfunction.

In connection with both retrieval and storage operations, the host adapter 15(n) will transfer access operation command information, together with processed data to be stored during a storage operation, over the bus 13, and a bus access control logic circuit 18 is provided to arbitrate among devices connected to the bus, including the host adapters 15(n), which require access to the bus 13. In controlling access to the bus 13, the bus access control logic circuit 18 may use any of a number of known bus access arbitration techniques, including distributed arbitration techniques in which bus access control logic circuitry is distributed among the devices which require access to the bus. In addition, the digital computer system 10 includes a system manager console 19 which permits a system manager to control various elements of the system 10 in a conventional manner. It will be appreciated that, although the system manager console 19 is shown in FIG. 1 as a separate element, any of the local computers 14(n) which may be used by an operator may provide the functionality of the console 19, in which case a separate element need not be provided.

The digital data storage subsystem 12 in one embodiment is generally similar to the digital data storage subsystem described in U.S. Pat. No. 5,206,939, entitled System And Method For Disk Mapping And Data Retrieval, issued Apr. 27, 1993 to Moshe Yanai, et al. As shown in FIG. 1, the digital data storage subsystem 12 includes a plurality of digital data stores 20(1) through 20(M) (generally identified by reference numeral 20(m)), each of which is also connected to bus 13. Each of the data stores 20(m) stores information, including programs and data, which may be accessed by the host computers 11(n) as well as processed data provided to the digital data storage subsystem 12 by the host computers 11(n).

Each data store 20(m), in turn, includes a storage controller 21(m) and one or more storage devices generally identified by reference numeral 22. The storage devices 22 may comprise any of the conventional magnetic disk and tape storage devices, as well as optical disk storage devices, and CD-ROM devices from which information may be retrieved. Each storage controller 21(m) connects to bus 13 and controls the storage of information which it receives thereover in the storage devices connected thereto. In addition, each storage controller 21(m) controls the retrieval of information from the storage devices 22 which are connected thereto for transmission over bus 13. As with the host adapters 15(n) access of bus 13, the bus access control logic circuit 18 also controls access by the storage controllers to the bus 13.

As with host adapters 15(n), each storage controller 21(m) includes an associated local event log 23(m) which an event log controller 24(m) may use to store event status information concerning the status of the storage controller 21(m) at selected points during an access operation, which may, in the event an error is detected, assist in diagnosing the cause of the error and in recovering therefrom. Each local event log 23(m), as is conventional, stores a plurality of log entries, with each log entry containing selected types of status information, which will be determined by the particular point during an access operation at which the log entry was generated, as well as a time stamp identifying the time, as determined by the storage controller's local clock (not shown), at which the log entry was generated. Typically, each local event log 23(m) will store either a selected number of entries or entries for a selected period of time.

The digital data storage subsystem 12 also includes a common memory subsystem 30 for caching information during an access operation and, in accordance with the invention, event status information providing selected status information concerning the status of the host computers 11(n) and the data stores 20(m) at certain points in their operations. The common memory subsystem 30 includes a cache memory 31 for caching information transferred by the host computers 11(n) to the digital data storage subsystem 12 to be stored during a storage operation, prior to storage in the data store(s) 20(m). Each of the host adapters 15(n) and each of the device controllers 21(m) includes a cache manager (identified "CACHE MGR" in FIG. 1) for facilitating access to the cache memory 31 over bus 13 to store information in, and retrieve information from, the cache 31. The operations performed by the host adapters' and device controllers' cache managers in connection with an access operation are described in the above-referenced Yanai patent and in U.S. Pat. No. 5,592,432, filed Sep. 5, 1995 entitled cache management system using time stamping for Replacement Queve, assigned to the assignee of the present invention, and will not be further described herein.

In accordance with the invention, the common memory subsystem 30 further includes a common event log 32 for providing a unitary integrated cache for the event status information from all of the host computers 11(n) and the data stores 20(m) at certain points in their operations. As described above, each of the host adapters 15(n) and each of the storage controllers 21(m) includes respective local event logs 16(n) and 23(m) which store event status information for use in recovery in the event of an error during an access operation. At each point at which a local log entry is to be generated, in addition to generating a log entry and storing it in its associated event log 16(n) and 23(m), each local event log controller 17(n) and 24(m) will also generate a common event log entry for storage in the common event log 32. The local event log controllers 17(n) and 24(m) store the common event log entries in the common event log 32 generally concurrently with storage of the corresponding local event log entries in their respective local event logs, so that the order in which the common event log entries are contained in the common event log corresponds to the order in which the events occurred across all of the host adapters 14(n) and storage controllers 21(m). Accordingly, the order in which events in the system 10 occurred can be determined from the order of the common event log entries in the common event log, which will simplify diagnosing errors or malfunctions which may occur in connection with various portions of a storage operation that are performed by various components of the digital computer system 10.

Figure 2:
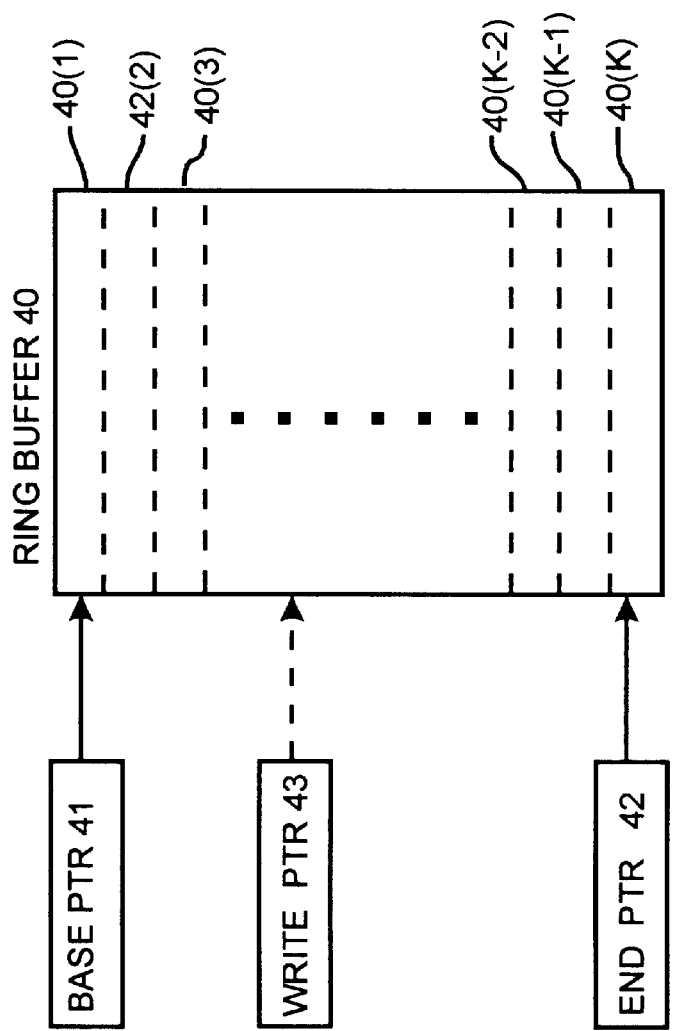
FIG. 2 schematically represents a functional block diagram illustrating the structure of an illustrative common event log which is useful in the digital computer system depicted in FIG. 1.

Before proceeding further, it will be helpful to describe the structure of the common event log 32 and of a common event log entry used in one embodiment of the invention. FIG. 2 schematically represents a fuctional block diagram illustrating the structure of an illustrative common event log 32 useful in one embodiment of the invention. With reference to FIG. 2, common event log 32 is in the form of a ring buffer 40 including a series of storage locations 40(1) through 40(K) (generally identified by reference numeral 40(k)), whose base location is defined by a base pointer 41 and whose end location is defined by an end pointer 42. That is, each storage location 40(k) is associated with a memory address, and the base pointer 41 contains the memory address of the base location 40(1) and the end pointer 42 contains the memory address of the end location 40(K). The storage locations 40(k) may form a part of a larger unitary address space (not shown) which may include the cache memory 31 and other elements (not shown) which together comprise the common memory subsystem 30, and the base and end pointers 41 and 42 will define the base and end locations of the portion of the memory space which is allocated to the common event log's ring buffer 40. In one particular embodiment, the common event log 32 forms part of a non-volatile memory, in which information stored in the memory will be preserved in the event of a failure of electrical power provided thereto. The common event log 32 also includes a write pointer 43 which points to the next storage location in the ring buffer 40 into which information is to be written, and is used in a manner described below.

Figure 3:
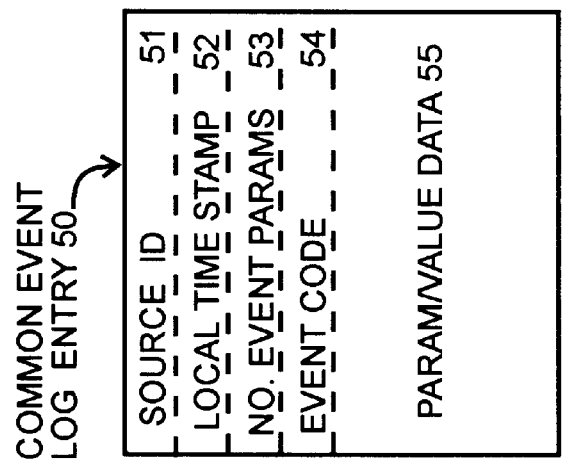
FIG. 3 schematically represents a functional block diagram illustrating the structure of an illustrative entry in the common event log depicted in FIG. 2.

FIG. 3 schematically represents a functional block diagram illustrating the structure of an illustrative common event log entry 50 in the common event log 32 described above in connection with FIG. 2. Generally, a common event log entry 50 that is generated by a local event log controller 17(n) or 24(m) corresponds to the structure of a local event log entry to be stored in the local event log 16(n) or 23(m), with the addition of a source identifier identifying the device (that is, the host computer 11(n) or data store 20(m)) which generated the entry 50. More specifically, with reference to FIG. 3, the common event log entry 50 comprises a plurality of fields, including a source identifier field 51, a local time stamp field 52, an event parameter number field 53, an event code field 54 and a parameter/value data field 55. In each common event log entry 50, the source identifier field 51 contains a value that identifies the host adapter 16(n) or the storage controller 23(m), that is, the "source unit," which generated the common event log entry 50, and the local time stamp field 52 contains a time stamp value identifying the time at which the source unit generated the common event log entry 50 (which, as described above, corresponds to the time, as determined by the source unit's clock, at which the event occurred for which the common event log entry was generated).

The event parameter number field 53, event code field 54 and parameter/value data field 55 in the common event log entry 50 contain the status information to be stored in the entry 50. In particular, the event parameter field 53 contains a value identifying the number of status parameters (that is, the number of types of status information) whose values are stored in the entry, which, in turn, is determined by the host adapter 15(n) or storage controller 23(m) based on the point in the access operation at which the entry 50 was generated. The event code field 54 contains a value that can be used to identify the point in the access operation at which the entry 50 was generated. Finally, the parameter/value data field 55 contains a number of records each of which identifies a status parameter and the parameter's value at the point in the access operation at which the entry 50 was generated. The parameter/value data field 55 may also end with a delimiter value which identifies the end of the common event log entry 50.

It will be appreciated that the number of status parameters, and their respective values, may differ as among the various points during an access operation at which a source device (that is, a host adapter 15(n) or storage controller 23(m)) may generate the common event log entries 50. Accordingly, the number of storage locations 40(k) of the ring buffer 40 (FIG. 2) required to store the parameter/value data field 55 will vary as among the various common event log entries. In addition, various ones of the other fields 51 through 54 may require several storage locations 40(k).

When a source device (that is, a host adapter 15(n) or storage controller 23(m)) is to store a common event log entry 50 in the common event log 32, it will retrieve the value of the write pointer 43 from the common memory subsystem 30 over bus 13 to identify the address of the location $40(k_{WRT})$ in which it is to begin storing the first field 51 of the entry 50. After retrieving the write pointer value, the source device immediately increments the value of the write pointer 43 by a value corresponding to the entry's size, that is, by the number of storage locations 40(k) required to store the entry 50, and store the incremented value in the write pointer 43 over bus 13. The source device will preferably perform the retrieval, incrementation and storage operations in connection with write pointer 43 using a conventional "read/modify/write" bus operation over bus 13, as will be described below. Since the buffer 40 is a ring buffer, if the value of the incremented write pointer 43 identifies a storage location beyond the end of the buffer 40 (that is, if the value of the incremented write pointer 43 is larger than the value of the end pointer 42), the source device will, after incrementing the write pointer value by the size value, subtract the value of the end pointer 42 from the incremented write pointer value (the difference corresponding to the number of storage locations beyond the end of buffer 40), and add the difference to the value contained in the base pointer 41. It will be appreciated that this operation can be expressed mathematically as:

WRITEP PTR(incr)=BASE PTR+(WRITE PTR(retr)+SIZE) mod (END PTR)

where "WRITE PTR(incr)" represents the value of the incremented write pointer, "BASE PTR" represents the value of the base pointer 41, "WRITE PTR(retr)" represents the value of the write pointer 43 as retrieved from the common event log 32 (FIG. 2), "SIZE" represents the size of the common event log entry 50 to be stored in the common event log, "END PTR" represents the value of the end pointer 42, and "mod" represents the "modulo" function.

As described above, in performing the write pointer retrieval, incrementation and storage operation, the source host adapter 15(n) or storage controller 23(m) preferably will use a conventional "read/modify/write" bus operation over bus 13. During a read/modify/write operation, the source device, after being granted control of the bus 13 by the bus access control logic circuit 18, will maintain control of the bus 13 through all three operations (that is, the retrieval, incrementation and storage operations). This will ensure that no other host adapter 15(n) or storage controller 23(m) can access the bus 13 and possibly retrieve the value of the write pointer after the source device has retrieved the write pointer value and before it has stored the incremented value. It will be appreciated that, if another host adapter 15(n) or storage controller 23(m) is able to retrieve the write pointer value after the source device retrieves the write pointer value but before it (the source device) stores the incremented value, both the source device and the other host adapter 15(n) or storage controller 23(m) will attempt to write a common event log entry starting from the same location 40(k) in the ring buffer 40, in which case one may undesirably overwrite the other's common event log entry.

The source device (that is, the host adapter 15(n) or storage controller 23(m)) which is to store a common event log entry 50 in the common event log 32), after it increments the value of the write pointer and stores the incremented value in the write pointer 43 as described above, will store the common event log entry 50 in the common event log 32, in particular in the successive storage locations 40(k) of the ring buffer 40 beginning with the storage location $40(k_{WRT})$ pointed to by the value of the retrieved write pointer. Since the source device, by incrementing the value of the write pointer 43 as described above, has essentially "reserved" the series of successive storage locations beginning with storage location $40(k_{WRT})$ sufficient to store its common event log entry 50, it can store the information in the various fields 51 through 55 of the entry 50 in the storage locations in a series of bus transaction operations over bus 13, which may be interleaved with other bus transaction operations initiated by it as well as other host adapters 15(n) and storage controllers 23(m).

With this background, the detailed operations performed by a source device (a host adapter 15(n) or storage controller 23(m)) in connection with storage of a common event log entry 50 in the common event log 32 will be described in connection with the flow chart in FIG. 4. With reference to FIG. 4, in response to a determination that an event log entry is to be generated (step 100), the source device, in particular the local event log controller 17(n) or 24(m), will generate an event log entry for storage as a local event log entry in its local event log 16(n) or 23(m) (step 101). Contemporaneously, the source device will issue a transfer request over bus 13 to enable the bus access control logic circuit 18 to initiate an arbitration operation (step 102). When the source device determines that the bus access control logic circuit 18 has granted its request (step 103), it (the source device) will initiate a read/modify/write operation as described above to retrieve the current value of the write pointer 43, increment it and store the incremented value in the write pointer 43 (step 104). Thereafter, source device, in one or more bus transactions over bus 13 using the value of the write pointer as retrieved in step 104, will store its source identifier together with the event log entry generated in step 101, thereby to store a common event log entry 50 in the common event log 32 (step 105).

As noted above, a number of source devices (host computers 11(n) and storage controllers 21(m)) may perform various operations in connection with a single access operation. The common event log entries 50 in the common event log 32 can be used in tracing events occurring among the source devices to assist in diagnosing malfunctions which may occur in connection with an access operation. The entries 50 will, preferably in their parameter/value data fields 55, include information such as an operation identifier which identifies the access operation, which will be used by all of the devices which are performing operations in connection with the access operation. In diagnosing a malfunction, the entries 50 in the common event log 32 can be scanned to locate entries related to the access operation, which may be analyzed in a conventional manner (which will depend on a number of factors including the type of access operation and characteristics of the various source devices) to determine the existence and cause of a malfunction. Since the source devices store common event log entries 50 in the common event log 32 in the order in which the events occur, the sequence of the common event log entries in the common event log 32 corresponds to the sequence in which the events occurred during the access operation. Accordingly, it will be appreciated that the event sequence can be determined without the necessity of referring to the time stamp information in the various entries 50.

The use of a common event log 32 for storing event status information in the order in which the events occur across all of the host computers 11(n) and data stores 20(m) which participate in access operations, provides a number of advantages. Since event status information is stored in the order in which the events occur, the order in which the events occur as among the various source devices can be determined from the order of the common event log entries in the common event log 32 without the necessity of referring to the entries' time stamps. Since the various source devices are not likely to have clocks which are perfectly synchronized, it is unlikely that the order of events as across the various source devices preforming diverse portions of an access operation can be determined from the entries' time stamps.

The size of the common event log 32 is preferably large enough to store common event log entries 50 which are likely to be generated by all of the source devices (both host computers 11(n) and data stores 20(m)) for at least several minutes, to ensure that common event log entries generated by the source devices for all of the portions of an access operation performed by them during an access operation. In one particular embodiment, the common event log 32 is selected to be on the order of eight megabytes in size, although it will be appreciated that the size may be larger or smaller based on the number of source devices, the rate at which they are likely to generate common event log entries 50 and the average sizes of the various common event log entries 50.

Although the invention has been described in connection with a digital computer system 10 in which each host computer 11(n) includes a local computer 14(n), with each local computer being associated with a host adapter 15(n), it will be appreciated that each host adapter 15(n) may connect to a plurality of local computers over, for example, a conventional computer network connection (not shown). In such an embodiment, the host adapter 15(n) may receive and process storage subsystem access requests from any of local computers which are connected to the network, substantially as described above in connection with FIG. 1. In addition, it will be appreciated that a computer network may have connected thereto a plurality of host adapters 15(n) which may separately receive and process storage subsystem access requests from the local computers over the network connection.

Furthermore, although the invention has been described in connection with a digital computer system 10 including a plurality of host computers 11(n) and a digital data storage subsystem 12 including a plurality of data stores 20(m), for storing events relating to storage and retrieval operations in connection with the digital data storage subsystem 12, it will be appreciated that the invention may be useful in connection with any digital computer system comprising a plurality of elements which separately and relatively independently operate on various portions of an operation, and which have separate timing or clock for maintaining local times. For example, the invention may find utility in connection with a distributed or parallel processing system comprising a number of processing nodes (which may be similar to the host computers" described above) each of which operate in connection with diverse portions of a common problem. In such a system, the processing nodes may periodically log event information at various selected points in their processing of their respective portions, and in the event of a malfunction the log information may be used to assist in diagnosing the cause of the malfunction.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A distributed computer system comprising a plurality of computer nodes and a common event log,
    A. the common event log including a plurality of storage locations for storing common event log entries,
    B. each computer node performing processing operations in connection with a respective program, each computer node generating, at selected points in the respective program, a respective event log entry including status information representing status of the computer node at a respective point at which the respective log entry was generated, the computer nodes storing respective event log entries which the nodes generate in both the common event log and in respective local event logs in the nodes contemporaneous with generation of the respective log entries;
so that the respective event log entries are stored in the common event log in the order in which the respective computer nodes reach the respective points in their respective programs;
    wherein all of the respective log entries that are stored in the respective local event logs are also stored in the common event log;
    and also wherein the respective log entries stored in the respective local event logs identify respective points in respective storage access operations at which the respective log entries stored in the respective local event logs were generated, the respective log entries stored in the respective local event logs also including respective status information that can be examined to determine cause of a detected malfunction in the respective storage access operations, the storage access operations involving use of host adapters to perform data retrieval and storage operations in connection with a data storage system.

2. A distributed computer system as defined in claim 1 in which at least one of said computer nodes is a digtal computer system.

3. A distributed computer system as defined in claim 1 in which at least one of said computer nodes is a mass storage subsystem.

4. A distributed computer system as defined in claim 1 in which:
    A. said common event log includes a write pointer which stores a value that identifies a storage location in which said respective event log entry may be stored; and
    B. each said computer node, when it is to store an event log entry, retrieves the write pointer value, increments the write pointer value by an amount corresponding to a number of storage locations required for the event log entry, and stores the incremented write pointer value in the write pointer, and thereafter uses the retrieved write pointer value to store the event log entry in the common event log.

5. A distributed computer system as defined in claim 4 in which the computer nodes and the common event log are interconnected by a common bus, the computer nodes performing the write pointer value retrieval, incrementation and storage operations using an atomic read/modify/write operation over the common bus.

6. A distributed computer system as defined in claim 4 in which the common event log comprises a ring buffer comprising a series of storage locations between a base location defined by a base pointer value and an end location defined by an end pointer value, the computer nodes using the base pointer value and the end pointer value in generating the incremented write pointer value.

7. A distributed computer system as defined in claim 6 in which each computer node generates the incremented write pointer value as:

WRITE PTR (incr)=BASE PTR+(WRITE PTR(retr)+SIZE) mod (END PTR)

where "WRITE PTR(incr)" represents the value of the incremented write pointer, "BASE PTR" represents the base pointer value, "WRITE PTR(retr)" represents the retrieved write pointer value "SIZE" represents the number of storage locations in which the event log entry is to be stored, "END PTR" represents the end pointer value, and "mod" represents the "modulo" function.

8. A distributed computer system as defined in claim 1, wherein the distributed computer system includes only a single common event log.

9. A computer node for use in a distributed computer system including a plurality of computer nodes and a common event log, the common event log including a plurality of storage locations for storing common event log entries, each said computer node performing processing operations in connection with a respective program, each respective computer node generating, at a respective point in the respective program, a respective event log entry including respective status information representing status of a respective storage access operation occurring at the respective point, the respective computer node storing event log entries which the respective computer node generates both in the common event log and in a respective local event log in the respective node contemporaneous with generation of the respective event log entries, so that respective event log entries are stored in the common event log in the order in which respective computer nodes reach respective points in their respective programs;
    wherein all of the respective log entries that are stored by the respective computer node in the respective local event log are also stored in the common event log;
    and also wherein, the respective log entries that are stored by the respective computer node in the respective local event log can be examined to determine cause of a detected malfunction in the respective storage access operation, the storage access operation involving use of a host adapter to perform at least one of data retrieval and storage in connection with a data storage system.

10. A computer node as defined in claim 9, comprising a digital computer system.

11. A computer node as defined in claim 9, comprising a mass storage subsystem.

12. A computer node as defined in claim 9, said common event log including a write pointer which stores a value that identifies a storage location in which said respective event log entry may be stored, said respective computer node, when it is to store an event log entry, retrieving the write pointer value, incrementing the write pointer value by an amount corresponding to a number of storage locations required for the event log entry, and storing the incremented write pointer value in the write pointer, and thereafter using the retrieved write pointer value to store the event log entry in the common event log.

13. A computer node as defined in claim 12 connected to the other computer nodes and the common event log over a common bus, and retrieving the write pointer value, incrementing and storing the write pointer value using an atomic read/modify/write operation over the common bus.

14. A computer node as defined in claim 12 in which the common event log comprises a ring buffer comprising a series of storage locations from a base location defined by a base pointer value to an end location defined by an end pointer value, and in which the base pointer value and the end pointer value are used in generating the incremented write pointer value.

15. A computer node as defined in claim 14, wherein the incremented write pointer value is generated as:

WRITE PTR (incr)=BASE PTR+(WRITE PTR (retr)+SIZE) mod (END PTR)

where "WRITE PTR(incr)" represents the value of the incremented write pointer, "BASE PTR" represents the base pointer value, "WRITE PTR(retr)" represents the retrieved write pointer value "SIZE" represents the number of storage locations in which the respective event log entry is to be stored, "END PTR" represents the end pointer value, and "mod" represents the "modulo" function.

16. A computer node as defined in claim 9, wherein the distributed computer system includes only a single common event log.

17. A method of operating a distributed computer system comprising a plurality of computer nodes and a common event log, the method comprising the steps of:
A. providing a common event log including a plurality of storage locations for storing common event log entries;
B. enabling each respective computer node to perform processing operations in connection with a respective program, each computer node:
  i. generating, at a respective point in the respective program, a respective event log entry including respective status information representing status of a respective storage access operation occurring at the respective point, and
  ii. storing generated event log entries both in the common event log and in respective local event logs in the nodes contemporaneous with generation of the respective event log entries, so that the event log entries are stored in the common event log in the order in which the respective computer nodes reach the respective points in their respective programs;

wherein all of the generated event log entries stored in the respective local event logs are also stored in the common event log;

and also wherein, the respective log entries stored in the respective log event logs can be examined to determine cause of a detected malfunction in the respective storage access operation, the storage access operation involving the use of a host adapter to perform at least one of data retrieval and storage in connection with a data storage system.

18. A method as defined in claim 17, said common event log including a write pointer which stores a value that identifies a storage location in which said respective event log entry may be stored, each said computer node, when it is to store one respective event log entry,
A. retrieving the write pointer value,
B. incrementing the write pointer value by an amount corresponding to a number of storage locations required for the event log entry,
C. storing the incremented write pointer value in the write pointer, and
D. thereafter using the retrieved write pointer value to store the one respective event log entry in the common event log.

19. A method defined in claim 18 in which the computer nodes and the common event log are interconnected by a common bus, the computer nodes using an atomic read/modify/write operation over the common bus to retrieve, increment, and store the write pointer value.

20. A method as defined in claim 18 in which the common event log comprises a ring buffer comprising a series of storage locations from a base location defined by a base pointer value to an end location defined by an end pointer value, the computer nodes using the base pointer value and the end pointer value in generating the incremented write pointer value.

21. A method as defined in claim 18 in which each computer node generates the incremented write pointer value as:

WRITE PTR (incr)=BASE PTR+(WRITE PTR (retr)+SIZE) mod (END PTR)

where "WRITE PTR(incr)" represents the value of the incremented write pointer, "BASE PTR" represents the base pointer value, "WRITE PTR(retr)" represents the retrieved write pointer value "SIZE" represents the number of storage locations in which the event log entry is to be stored, "END PTR" represents the end pointer value, and "mod" represents the "modulo" function.

22. A method as defined in claim 17, wherein the distributed computer system includes only a single common event log.

* * * * *